United States Patent [19]

Nichols

[11] 4,376,050

[45] Mar. 8, 1983

[54] SURGE DEVICES FOR LIQUID-SOLID SEPARATORS

[75] Inventor: Donald F. Nichols, Boise, Id.

[73] Assignee: Morrison-Knudsen Company, Inc., Boise, Id.

[21] Appl. No.: 252,282

[22] Filed: Apr. 9, 1981

Related U.S. Application Data

[63] Continuation of Ser. No. 88,628, Oct. 26, 1979, abandoned.

[51] Int. Cl.³ .............................................. B01D 35/00
[52] U.S. Cl. ..................................... 210/248; 210/349
[58] Field of Search ...................... 210/248, 251, 257.1, 210/349, 521

[56] References Cited

U.S. PATENT DOCUMENTS 3,463,172 8/1969 Naylor .................................. 210/521
3,674,687 7/1972 Quase ................................ 210/257.1

Primary Examiner—Ivars C. Cintins
Attorney, Agent, or Firm—Buell, Blenko, Ziesenheim & Beck

[57] ABSTRACT

The specification discloses surge controlling means for a liquid-solid separator. A plurality of surge compartments are provided above overflow weirs in a holding tank for the liquid-solid material.

4 Claims, 5 Drawing Figures

SURGE DEVICES FOR LIQUID-SOLID SEPARATORS

This is a continuation of application Ser. No. 088,628, filed Oct. 26, 1979, now abandoned.

This invention relates to apparatus for control of surges in liquid-solid slurries being delivered to a vibrating screen solids separator. More particularly, the invention is concerned with avoiding pollution problems which arise from surges being delivered to the screen of the separator.

When a hole or shaft is drilled into the earth it is common to remove the cuttings in a fluid. For example, when a shaft is drilled into the ocean bottom, the cuttings produced by the drill string can be brought to the surface in a stream of sea water through a "blooie line". In most parts of the world the discharge from the blooie line is dumped into the ocean and the solids are allowed to settle to the ocean bottom. In the United States environmental regulations forbid such a practice. Instead, the driller is required to screen the slurry from the blooie line to provide for separation of solids from the water, and to transport the solids to land for disposal.

In the drilling of some shafts into the ocean bottom, an air lift was used to lift cuttings, sand and water in the blooie line to the surface. The slurry was delivered at the top of the drill string to a "Rumba" solids separator as supplied by Hutchison-Hayes International, Inc. In the intended operation of the separator the slurry is delivered to a mud holding tank having one or more weirs through which overflow from the tank is intended to pass onto the separator screens. The tank is generally enclosed but one or more doors are provided for access, clean-out and the like. The air lift was operated by introducing quantities of compressed air into the blooie line at the bottom of the drill stand thereby reducing the effective density in the blooie line and causing an upward movement of water and solids. Because of the air lift, there is a tendency to develop surges with clumps of air bubbles at irregular intervals. Those surges were found to produce sudden and heavy discharges from the mud holding tank, causing over loading of the screens and, in some cases, blowing open the mud holding tank doors. The result was to cause unacceptable discharge of solids into the ocean.

In an effort to overcome the problem, cylindrical surge tanks were fitted to the top of the mud holding tank. While the surge tanks were of some benefit in reducing the magnitude of the problem, they did not overcome the problem of discharging unacceptable quantities of solids back into the ocean. Accordingly, the separator was again modified in accordance with the present invention.

I provide, in combination with a liquid-solid separator, a receiving tank having at least one overflow weir and surge means mounted above the receiving tank and comprising a plurality of vertically extending compartments. I prefer to provide a plurality of cylindrical tanks above a receiving tank which forms an extension of the receiving tank. I further prefer to provide a plurality of vertically disposed baffles within each cylindrical tank. I further prefer to provide air passages at the top of each baffle extending between adjacent compartments formed by the baffles.

Other details, objects, and advantages of my invention will become more apparent as the following description of a present preferred embodiment proceeds.

In the accompanying drawings, I have illustrated a present preferred embodiment of my invention in which.

Figure 1:
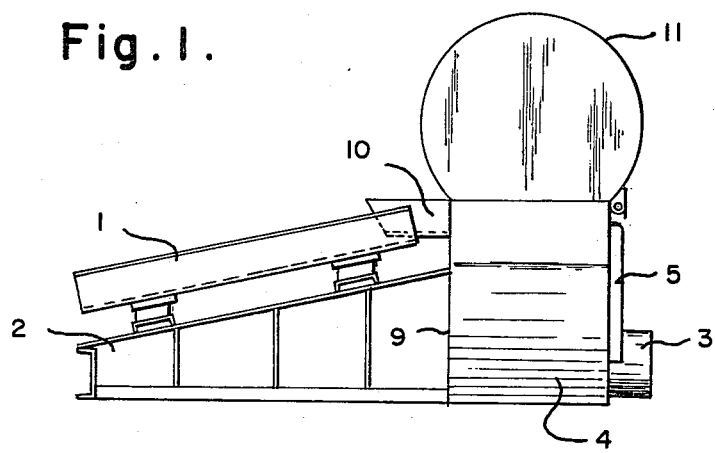
FIG. 1 is a side elevational view of the primary screen of a conventional vibrating screen liquid-solid separator showing the surge device of the invention.
Figure 2:
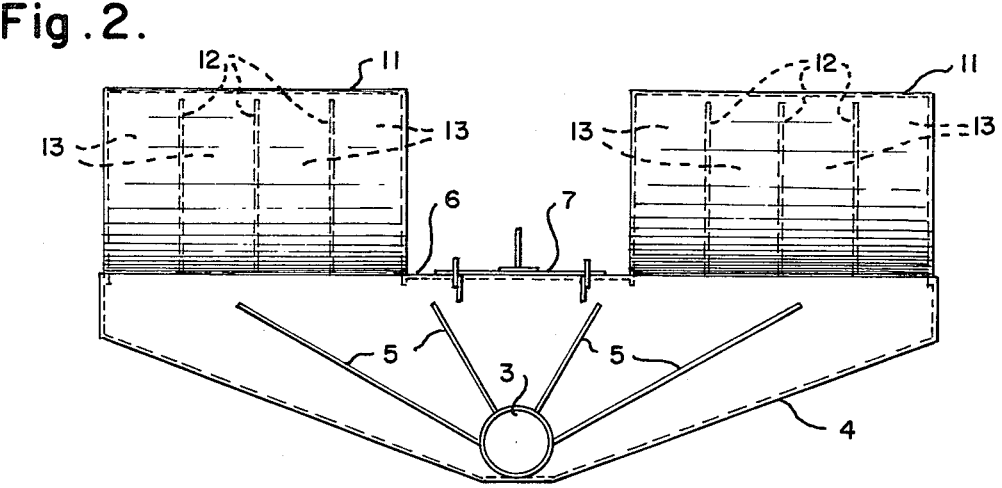
FIG. 2 is a side elevational view of the surge device shown in FIG. 1 viewed from the liquid-solid delivery side.
Figure 3:
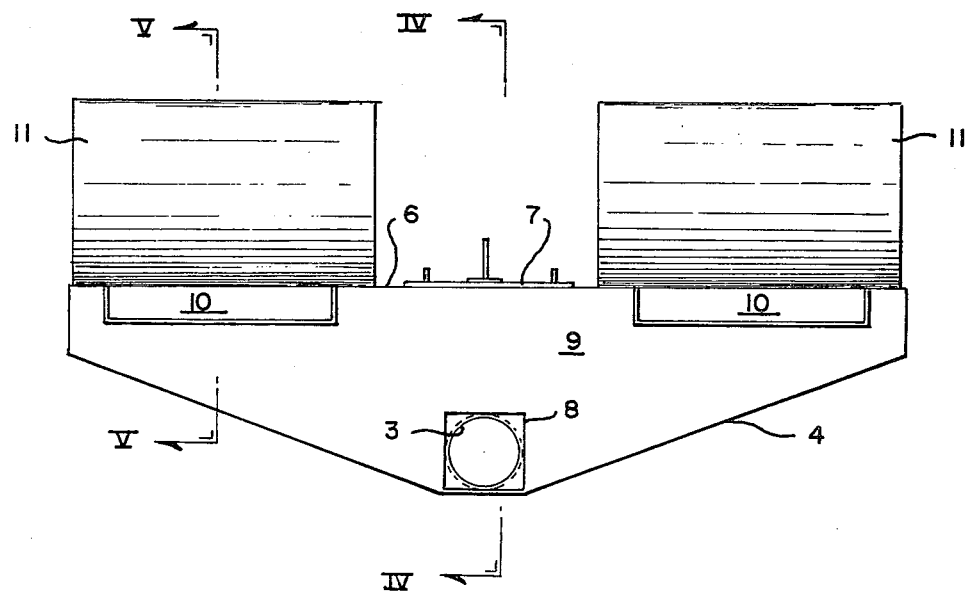
FIG. 3 is a side elevational view of the surge device shown in FIG. 1 viewed from the separator side.
Figure 4:
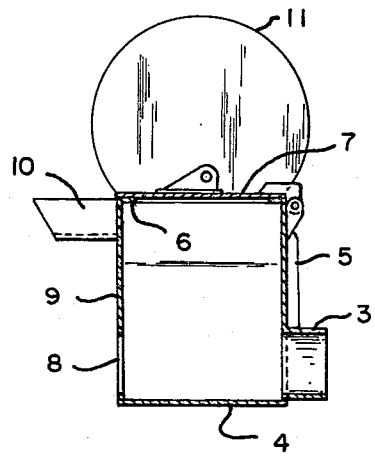
FIG. 4 is a sectional view taken along line IV—IV of FIG. 3.
Figure 5:
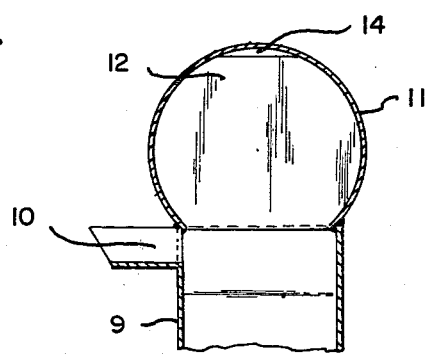
FIG. 5 is a sectional view taken along line V—V of FIG. 3.

A conventional solids separator, such as a Hutchison-Hayes Rumba 102 Solids Separator, comprises a pair of primary screens 1 onto which a liquid-solid slurry is delivered for primary separation. The screens are mounted on a frame 2 for the separator, only a part of which is shown in the drawings. A liquid-solid slurry is delivered from the blooie line at a fitting 3 in the bottom of a mud holding tank 4. Struts 5 are welded to the outside wall of tank 4 adjacent fitting 3 to stiffen the panel against varying hydraulic pressures within tank 4. A top plate 6 in tank 4 is provided with a door 7 for access for clean out and the like. A bypass door 8 is provided in the bottom of tank 4 opposite to fitting 3. When door 8 is opened the liquid-solid material delivered through fitting 3 bypasses primary screen 1 and goes directly to a secondary holding tank, not shown in the drawings. A panel 9 of holding tank 4 is on the side adjacent screens 1. Two weirs 10 are formed in the top of panel 9.

A cylindrical surge tank 11 is positioned on the top of mud handling tank 4 above each weir 9. A segment of each tank 11 is removed by a plane extending through top plate 6 of mud holding tank 4. Top plate 6 is removed where it intersects with tank 11 so that there is access between tank 4 and each of tanks 11 to the full width of tank 4.

A series of baffles 12 are positioned within each tank 11 by welding. Baffles 12 are arranged vertically parallel dividing each surge tank 11 into a plurality of compartments 13 of substantially equal volume. A gap 14 is provided at the top of each baffle 12 and allows air to move freely between compartments 13.

In the intended operation liquid-solid material will enter tank 4 through fitting 3 at a steady rate. If bypass door 8 is closed, the slurry level in the tank will rise until it overflows tank 4 through weirs 10. The slurry will then be deposited across the width of screens 1 uniformly and evenly, each weir 10 depositing material on to one of the screens.

In actual operation, using an air lift in the blooie line, the slurry of water, cuttings and water is discharged through fitting 5 with irregular and uncontrolled surges accompanied by bursting or decay of air bubbles which have provided the air lift. The result is a bubbling and surging in the mud holding tank 4. Prior to installation of tanks 11, the bubbling and surging was sufficient to cause mud tank doors to open and also to deliver slugs of material over weirs 10. As a result unacceptable quantities of solids were carried back into the ocean. The installation of tanks 11 and the fitting of baffles 12 within tanks 10 prevents uncontrolled surging. Instead, surges are controlled and the result is that the separator acts in the desired manner to separate solids from liquid without loss of unacceptable amounts of solids into the water.

While I have illustrated and described a present preferred embodiment of my invention, it is to be understood that I do not limit myself thereto, and that my invention may be otherwise variously practiced within the scope of the following claims.

I claim:

1. In a liquid-solid separator having a tank arranged to receive liquid-solid material delivered in surges with entrained air and separator screen means for separation of solids from liquid, said screen means being positioned to receive a controlled flow of liquid-solid material from overflow weir means in said tank, the improvement which comprises an extension of said tank vertically above said weir means, said extension being in the form of a closed upward extension of the tank, said extension being divided by vertical partitions into a plurality of separated compartments above the weir means, whereby surges of material into the tank rise freely upward without restriction while being confined against lateral movement by said partitions.

2. In a liquid-solid separator having a separating screen and a holding tank connected to a source of solids-containing liquid delivered in surges with entrained air and positioned to distribute said liquid to the separator screen through an opening at a side of the holding tank, the improvement which comprises surge receiver means mounted directly on and above the holding tank, said surge means being in the form of a closed upward extension of the holding tank having a plurality of vertically disposed baffles which divide the upper part of the holding tank into separate compartments whereby surges of liquid in the tank rise freely upward while being confined by said baffles.

3. In a liquid-solid separator according to claim 2, the improvement in which the surge receiver means comprise a plurality of cylindrical tanks mounted on a horizontal axis and divided by vertically extending plates.

4. A liquid-solid separator as set forth in claim 3 in which air passages are provided between the tops of the spaces formed within the tanks by the plates.

* * * * *